Patented Feb. 6, 1940

2,189,509

UNITED STATES PATENT OFFICE 2,189,509

ACID WOOL DYESTUFFS OF THE ANTHRAQUINONE SERIES

Hans Schlichenmeier, Frankfort-on-the-Main-Hochst, Germany, assignor to General Aniline & Film Corporation, a corporation of Delaware No Drawing. Application July 3, 1937, Serial No. 151,965. In Germany July 9, 1936

4 Claims. (Cl. 260—372)

The present invention relates to acid wool dyestuffs of the anthraquinone series.

I have found that new blue to violet acid wool dyestuffs of the anthraquinone series are obtained by treating with a halogenating agent, advantageously in the presence of a halogenation catalyst, such as iodine or iron, a dyestuff of the general formula:

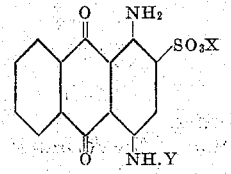

wherein X is hydrogen or an alkali metal atom and Y stands for an aryl group, for instance, of the benzene series. The halogenation may be performed, for instance, in an aqueous suspension or in a sulfuric acid solution. By applying predetermined quantities of the halogen, mono- or di-halogen compounds may be obtained without incurring the elimination of the sulfo group. By the introduction of the halogen the shade of the new dyestuffs is displaced to the red side in comparison with the parent dyestuffs, this the more so the more halogen has been introduced. Due to the beautiful shade and their good properties of fastness the new dyestuffs constitute a valuable addition to known dyestuffs.

The following examples serve to illustrate the invention, but they are not intended to limit it thereto; the parts are by weight, unless otherwise stated:

(1) 24 parts of the dyestuff having the following constitution:

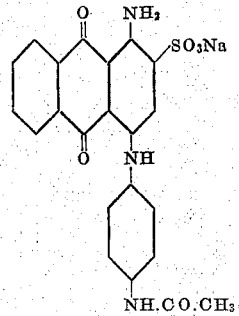

are introduced at 0° C. into 250 parts by volume of sulfuric acid of 66° Bé. As soon as the dyestuff has dissolved, 0.5 part of iodine is added and gaseous chlorine is introduced at 0° C. to 10° C., until after escape of the hydrogen chloride formed the weight of the mixture has increased by about two parts. The mixture is then poured on ice, filtered with suction and the solid matter washed until neutral and dried. The new dyestuff thus obtained is a crystalline blue powder. It contains one atom in proportion of chlorine. It dyes wool in an acid bath fast blue tints which are much redder than those obtained with the parent dyestuff.

(2) 24 parts of the parent material of Example 1 are dissolved at 0° C. to 5° C. in 300 parts by volume of sulfuric acid of 66° Bé. After addition of 0.5 part of iodine, at about +5° C., 9 parts of bromine are added drop by drop. Hydrogen bromide is evolved. In order to complete the reaction the whole is stirred overnight at room temperature and then poured upon ice; the blue dyestuff which has separated is filtered with suction and washed with water until neutral. When dry, it is a blue powder which dyes wool fast blue tints. The dyestuff contains one atom in proportion of bromine.

(3) 24 parts of the parent material of Example 1 are dissolved in 300 parts by volume of sulfuric acid of 66° Bé. After addition of 0.5 part of iodine 18 parts of bromine are added drop by drop at room temperature. The bromine is caused to react for 50 hours at room temperature, a large amount of hydrogen bromide being evolved. The dyestuff obtained is worked up as usual. In the dry state, it is a blue powder containing 2 atomic proportions of bromine.

(4) 25 parts of the dyestuff of the following constitution:

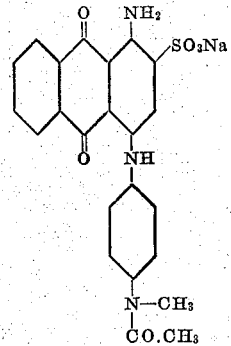

are converted into the mono-halogen compounds, as described in Examples 1 and 2. The new dyestuffs dye wool tints which are distinctly redder than those of the parent dyestuff. The dyeings possess good properties of fastness.

(5) By causing 2 molecular proportions of bromine to act as described in Example 3 upon the dyestuff used as parent material in Example 4, a dyestuff is obtained which dyes wool violet tints of good properties of fastness.

(6) 20 parts of sodium 1-amino-4-anilino-anthraquinone-2-sulfonate are dissolved in 400 parts of sulfuric acid of 30%. After addition of 0.5 gram of iodine, 8 parts of bromine are added, drop by drop, at 0° C. to 5° C. The whole is further stirred for 2½ hours, and then is poured upon ice and the blue precipitate obtained is filtered with suction. The product is then washed with a sodium chloride solution until neutral and dried. The new dyestuff is a blue powder which dissolves in concentrated sulfuric acid to a green-blue solution. It contains one atomic proportion of bromine.

(7) 10 parts of 1-amino-4-anilino-anthraquinone-2-sulfonic acid are made into a suspension with 200 parts of water. After addition of 0.25 part of iodine, 4 parts of bromine in 25 parts of concentrated hydrochloric acid are added, drop by drop. The mixture is heated, while stirring, for about 30 hours at 25° C. to 30° C. and the dyestuff formed is filtered with suction. It contains one atomic proportion of bromine. The bromine atom stands, however, apparently in another position than in the dyestuff obtained according to the process of Example 6.

(8) 20 parts of 1-amino-4-anilino-anthraquinone-2-sulfonic acid are dissolved in 300 parts of sulfuric acid of 66° Bé. and 8 parts of bromine are added drop by drop at about 0° C. The whole is further stirred for about 5 hours, the dyestuff solution containing the sulfuric acid is poured upon ice and the blue dyestuff thus obtained is filtered with suction. When dry, it is a blue powder having similar dyeing properties as the dyestuff obtained according to the process of Example 6.

I claim:
1. The compounds of the general formula:

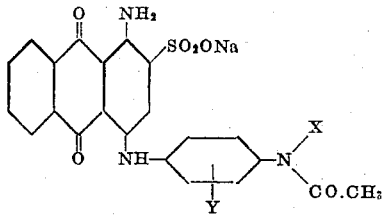

wherein X represents a member of the group consisting of hydrogen and methyl, Y represents a member of the group consisting of Cl, $Cl_2$, Br and $Br_2$, being dyestuffs of good fastness properties.

2. The compound of the formula:

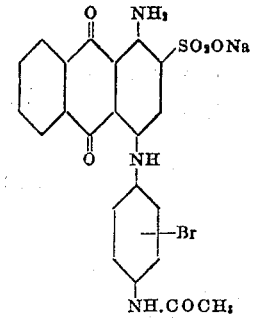

being a blue powder which dyes wool fast blue tints.

3. The compound of the formula:

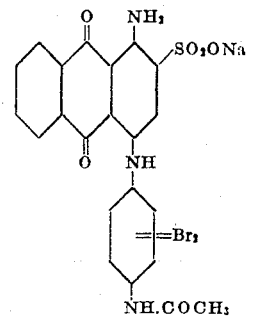

being a blue powder.

4. The compound of the formula:

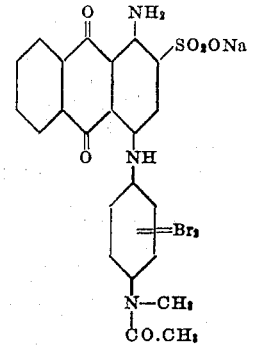

being a dyestuff which dyes wool violet tints of good properties of fastness.

HANS SCHLICHENMEIER.